United States Patent
Nettamo et al.

(10) Patent No.: US 8,229,478 B2
(45) Date of Patent: Jul. 24, 2012

(54) METHOD FOR UPDATING SESSION INITIATION INFORMATION IN CONNECTION WITH A TELEPHONE CALL AND A TERMINAL DEVICE USING THE METHOD

(75) Inventors: Esa Nettamo, Oulu (FI); Mikko Nirhamo, Kempele (FI); Sami Paihonen, Kempele (FI)

(73) Assignee: Nokia Corporation, Espoo (FI)

( * ) Notice: Subject to any disclaimer, the term of this patent is extended or adjusted under 35 U.S.C. 154(b) by 744 days.

(21) Appl. No.: 10/558,012

(22) PCT Filed: May 13, 2004

(86) PCT No.: PCT/FI2004/000287
§ 371 (c)(1),
(2), (4) Date: Sep. 4, 2007

(87) PCT Pub. No.: WO2004/105342
PCT Pub. Date: Dec. 2, 2004

(65) Prior Publication Data
US 2008/0102891 A1    May 1, 2008

(30) Foreign Application Priority Data
May 22, 2003  (FI) .................................. 20030776

(51) Int. Cl.
*H04W 4/00*  (2009.01)

(52) U.S. Cl. ........ 455/466; 455/557; 455/518; 455/519; 709/227; 370/352

(58) Field of Classification Search .................. 370/352, 370/389, 260, 261, 282, 338, 395.2; 455/466, 455/557, 518, 519; 709/227, 228, 230
See application file for complete search history.

(56) References Cited

U.S. PATENT DOCUMENTS

| 6,154,528 A | 11/2000 | Bennett, III et al. ........ 379/93.25 |
| 7,747,761 B2 * | 6/2010 | Wengrovitz .................. 709/228 |
| 2002/0049644 A1 * | 4/2002 | Kargman ........................ 705/26 |
| 2003/0137991 A1 * | 7/2003 | Doshi et al. ................... 370/466 |

FOREIGN PATENT DOCUMENTS

| EP | 1 100 250 A2 | 5/2001 |
| WO | WO 98/48551 | 10/1998 |
| WO | WO 02/07396 A1 | 1/2002 |
| WO | WO 03/021387 A2 | 3/2003 |

OTHER PUBLICATIONS

Chinese Office action for corresponding CN application No. 200480014069.4 dated Jan. 6, 2011, pp. 1-13.
Chinese Office action for corresponding CN application No. 2004800140694 dated Sep. 5, 2008, pp. 1-19.

* cited by examiner

*Primary Examiner* — Kamran Afshar
*Assistant Examiner* — Dung Lam
(74) *Attorney, Agent, or Firm* — Harrington & Smith

(57) ABSTRACT

The invention relates to a method for updating session initiation information saved in a terminal device (14, 15) of a data communications network (12), and a data communications network arrangement utilizing the method and a mobile terminal device (14, 15, 40) belonging to the data communications network arrangement, in which method either the SIP protocol or a conventional telephone number is used for session initiation.

19 Claims, 4 Drawing Sheets

METHOD FOR UPDATING SESSION INITIATION INFORMATION IN CONNECTION WITH A TELEPHONE CALL AND A TERMINAL DEVICE USING THE METHOD

FIELD OF THE INVENTION

The invention relates to a method for updating session initiation information saved in a terminal device connected to a data communications network which uses either SIP (Session Initiation Protocol) or a conventional telephone number for setting up a connection. The invention also relates to a data communications network arrangement using the method, a terminal device used in the data communications network and a software application saved in the terminal device, which implements the method.

BACKGROUND

Conventionally, a telephone connection to be established is controlled and initiated using a telephone number. Each terminal device or user has a unique serial number, and by dialling this number the user can establish a connection only with this one terminal device or its user. In practice, this technique has been the only possibility for establishing a connection in conventional circuit-switched telephone networks.

The emergence of various data networks has brought along also other ways to control or establish a communications connection between two terminal devices. Today, more and more conventional telephone calls are also transmitted via these networks that were originally intended for data transfer. This provides the possibility of using packet-switched data transfer connections in which the cost of data communications is reasonably low. One example of such networks is the Internet. In the Internet, the contact information of the other party is generally defined or presented in some other way than the conventional telephone number. One possible way of establishing a communications connection in these data networks is to use SIP, the Session Initiation Protocol. The Session Initiation Protocol has been standardized by IETF (Internet Engineering Task Force), and its standard number is RFC 2543. The recipient's or user's address according to SIP is of the form: user@network station[parameters] [additional information], i.e. it resembles the form of e-mail addresses. Thus the SIP protocol makes it possible to use various addresses that resemble e-mail addresses for establishing voice connections as well.

Even today a telephone user can come to a situation where one of the persons to be reached uses a conventional telephone number and some other person to be reached uses a "telephone number" enabled by the SIP protocol, or a connection identifier. In practice, this sets higher requirements for the telephone user, because the contact information of the other party can be any of the ways of presentation described above. In one way or another the telephone user must remain up to date and update the contact information of the other party frequently enough in order to make it as easy as possible to establish a connection. This updating work takes time and is laborious, and therefore it is often neglected.

SUMMARY

It is an objective of the present invention to provide a method and a data communications network arrangement, which can be used to ensure the up-to-date condition of the contact information of the person with whom a communications connection has been established using the SIP protocol. Therefore, in the procedure according to the invention it is possible to use, when establishing a new voice connection, the most suitable session initiation procedure which is always up to date, and it is not necessary for the user to look for the session initiation information needed before the initiation of the session in a separate step.

The objectives of the invention are achieved by a procedure in which during an active communications connection, the terminal devices in the connection exchange up-to-date session initiation information concerning each other. When the user so wishes, the terminal devices transmit/save the received session initiation information in a telephone memo or the like used by the terminal device at the terminal device/person in question. Next time the last updated information is used when initiating a session.

The method according to the invention has the advantage that when establishing a new communications connection, it is always possible to use the most up-to-date session initiation information based on the previous communications connection.

In addition, the invention has the advantage that the information updating procedure can take place independently of the terminal device user, but the user can always prevent the updating of his/her contact information to another device.

Furthermore, the invention has the advantage that the user of the terminal device is saved the trouble of updating the information manually.

The method according to the invention for updating the session initiation information of a terminal device connected to a data communications network is characterized in that during a communications connection established using the SIP protocol, the terminal devices in the communications connection exchange session initiation information.

The data communications network arrangement according to the invention is characterized in that during a communications connection established in the data communications network arrangement using the SIP protocol, the terminal devices in the communications connection are arranged to exchange session initiation information.

The terminal device according to the invention is characterized in that during a communications connection established using the SIP protocol, the first terminal device is arranged both to send its own session initiation information to another terminal device and to receive the session initiation information of another terminal device.

The software application according to the invention is characterized in that it comprises software means for exchanging session initiation information between terminal devices, if the communications connection has been established using the SIP protocol.

Some preferred embodiments of the invention are described in the dependent claims.

The basic idea of the invention is the following: The terminal device comprises a software application by means of which it is possible to transfer, between two terminal devices in a communications connection with each other, information on the procedures and types of address information that can be used to establish a communications connection with the terminal device. During the communications connection, the terminal device receives and checks contact information it has received from another terminal device, and this information is compared with previous information that may exist in the memory of the terminal device. If the pieces of information differ from each other or they do not exist yet, the received session initiation information is saved in the memory of the terminal device as the new contact information of the person or terminal device in question. Next time when a communications connection with the same person or terminal device is wanted, the new contact information found in the memory of the terminal device is used as the default value for session initiation.

BRIEF DESCRIPTION OF THE DRAWINGS

In the following, the invention will be described in more detail. Reference will be made to the accompanying figures, in which.

DETAILED DESCRIPTION

Figure 1:
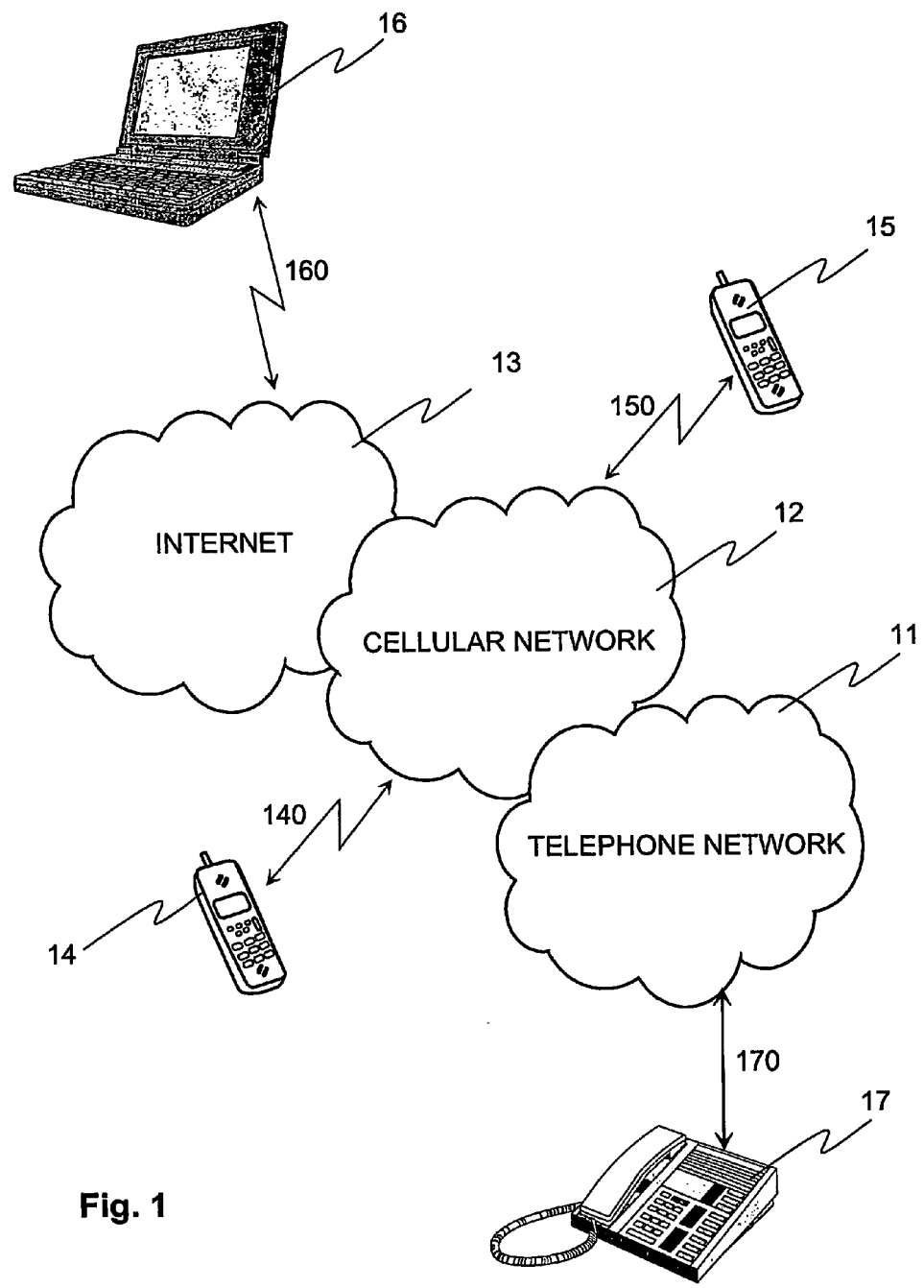
FIG. 1 shows, by way of example, a network arrangement according to the invention for establishing a communications connection.

FIG. 1 shows an example in which the method according to the invention can be advantageously applied. The invention is not limited to the data communications network examples shown in FIG. 1, but it can also be applied to any other data communications network in which or through which the session initiation messages according to the SIP protocol can be transferred from one terminal device to another. The example of FIG. 1 shows three different data transfer networks: the Internet, reference number 13, a cellular telephone network, reference number 12, and a conventional telephone network, reference number 11. The data communications networks shown in the example of FIG. 1 can transfer, at least in a limited manner, messages and signals from one network to another.

Reference numbers 14 and 15 denote two mobile terminal devices with voice connection capability, which are connected to the cellular network 12 and establish wireless communications connections 140 and 150 with the core of the cellular network 12. Reference number 17 denotes a telephone connected to the telephone network 11 with a fixed connection 170. The telephone 17 can be a telephone based on analogue technology or alternatively a telephone based on ISDN (Integrated Services Digital Network) technology. Reference number No. 16 denotes a data processing device, which is connected to the Internet 13 via a communications connection 160. This communications connection 160 can be either a fixed or a wireless communications connection. The data processing device 16 advantageously also comprises means by which a voice connection can be initiated to another corresponding device or the terminal devices 14 and 15 of a cellular network or a telephone 17 shown in the figure.

In the example of FIG. 1, it is thus possible to initiate a voice connection between any two terminal devices, e.g. from terminal device 14 to terminal device 15. The invention is advantageously applied in a situation where at least the terminal device 14 requesting the connection uses the SIP protocol. During the session initiation procedure, the terminal device 14 that requested the connection sends its own contact information via the data communications network 12 used to another receiving terminal device 15. The data communications network 12 used knows whether or not the receiving terminal device 15 can use the SIP protocol. If it can use the SIP protocol, the information of the terminal device 14 that requested the connection is sent to the recipient 15. If the receiving terminal device or the recipient 15 allows transmitting its own contact information, it is transmitted via the network 12 to the terminal device 14 that requested the connection. The received contact information of the other party can be saved in both terminal devices 14 and 15, if it is considered necessary.

If it is found out during session initiation that the recipient, e.g. the telephone 17, cannot use the SIP protocol, the data communications network used can convert the session initiation information of the recipient into a form in which a communications connection can be established. Information about this manner of session initiation and the address/number created is advantageously returned to the terminal device that requested a communications connection.

Figure 2:
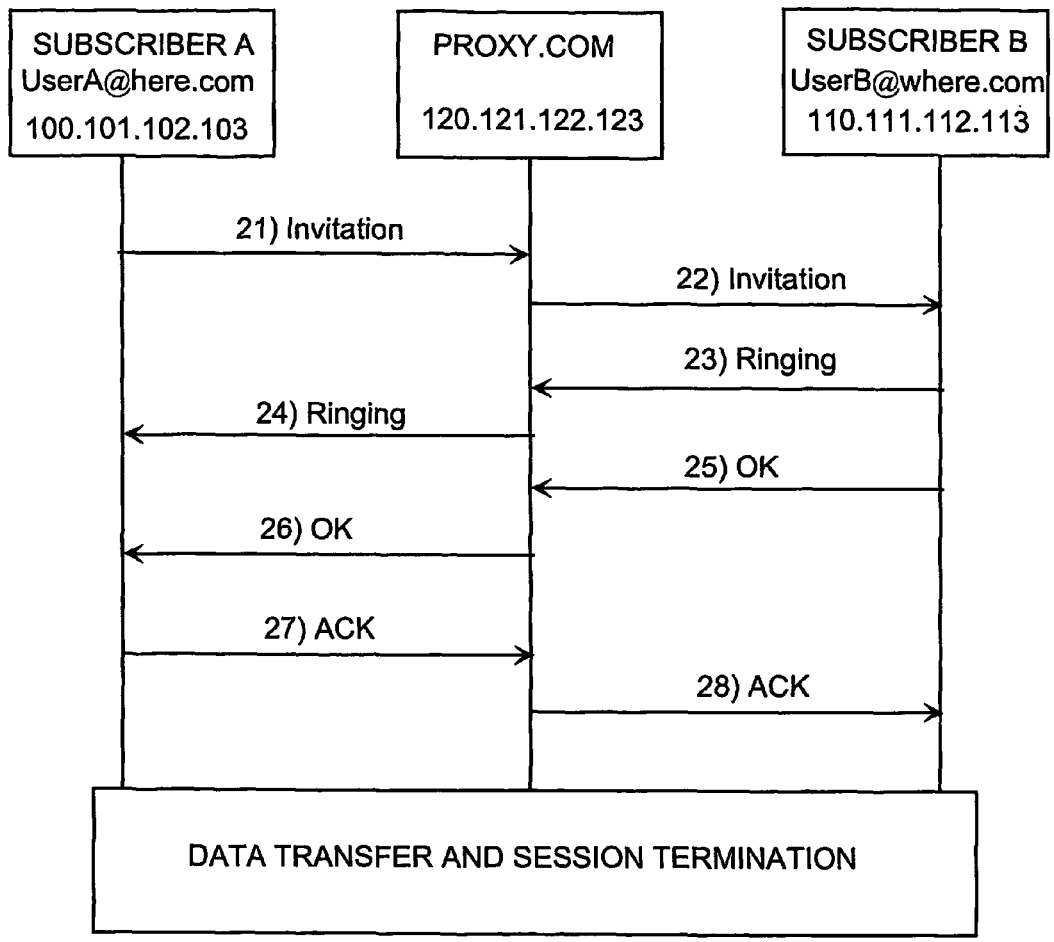
FIG. 2 shows, by way of example, the session initiation procedure between two terminal devices as a signal flow diagram.

FIG. 2 shows, as an example, a signal flow diagram, which shows how the method according to the invention can be utilized in connection with terminal devices that use the SIP protocol. FIG. 2 shows two subscribers: the first subscriber A, the session initiation information of whom is, according to the example, UserA@here.com and the IP address 100.101.102.103, and the second subscriber B, the session initiation information of whom is UserB@where.com and the IP address 110.111.112.113. Naturally, some other feasible unique user identifier which can be used by the data communications network is a possible alternative to be added to the subscriber information. Data communications between these two subscribers A and B is controlled and supervised by the proxy server PROXY.com, which belongs to the data communications network and the IP address of which is 120.121.122.123.

In the example of FIG. 2, subscriber A wants to initiate a communications connection to subscriber B. Subscriber A sends an invitation 21, which is directed to the proxy server PROXY.com. The invitation 21 comprises at least one piece of the contact information of subscriber B known by subscriber A. The proxy server directs the invitation 22 to subscriber B. Subscriber B is alerted, of which alert subscriber B transmits a message 23, which is directed via the proxy server as a message 24 to subscriber A. When subscriber B is ready for data transfer, an OK signal is transmitted. The session initiation information of subscriber B according to the invention can advantageously be included in this OK signal 25. They can be transmitted fully automatically, or subscriber B must accept the transmission of session initiation information separately in each case. For example, automatic transmission of information can be used for a calling subscriber who is already known, whereas information is transmitted to a previously unknown caller only with the permission of subscriber B.

From the proxy server PROXY.com, the information of subscriber B is then transmitted in connection with the signal 26 to subscriber A. When subscriber A has received the message 26, it sends an acknowledgement message ACK 27. The session initiation information of subscriber A can advantageously be included in this acknowledgement message ACK 27. From the proxy server, the acknowledgement message ACK is transmitted as a message 28 to subscriber B. Thus the session initiation information of each party has been transferred to the other party, if it has been considered necessary.

After this, data transfer continues between the terminal devices and is terminated when either of the users asks for it. The session initiation information according to the invention can naturally also be transmitted during the actual data transfer or as part of the session termination procedure. The exchange of session initiation information that takes place during data transfer or session termination is advantageously carried out at the request of or as accepted by either user.

Figure 3:
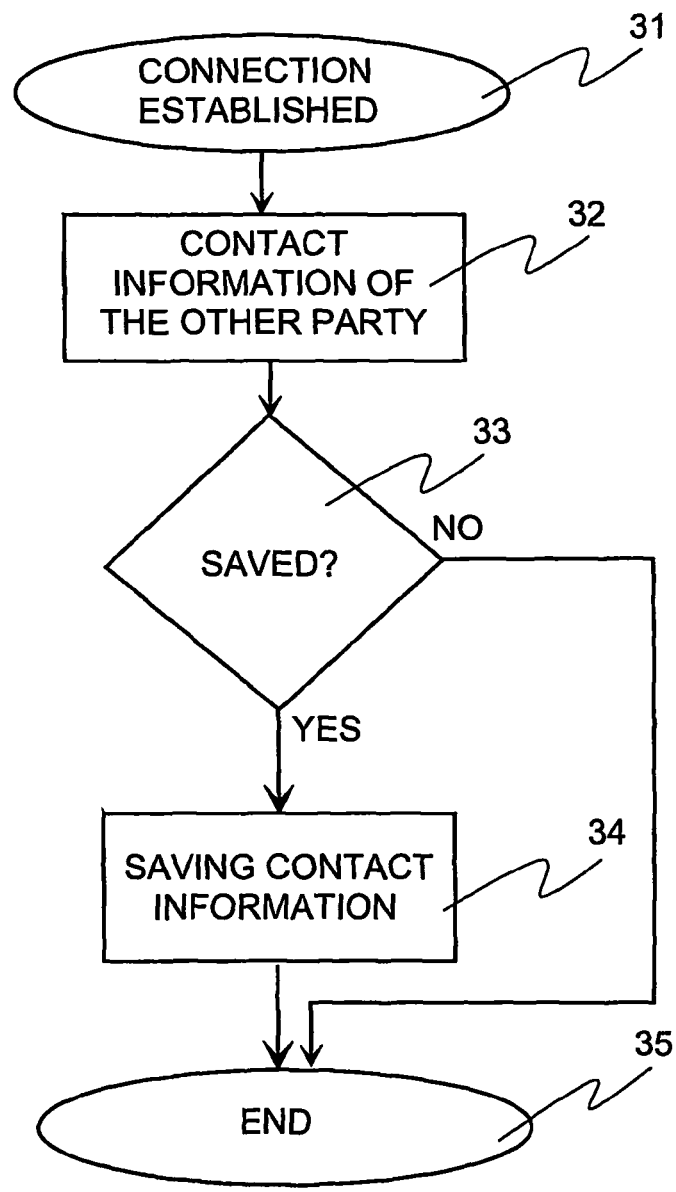
FIG. 3 shows, by way of example, a flow chart for saving information in terminal devices.

FIG. 3 shows, by way of example, a flow chart of the steps of handling the session initiation information of the other party that take place in the subscriber's terminal device. In step 31, a communications connection has been established between two terminal devices by using the procedure shown in FIG. 2, for example. In that case, the session initiation information of the first subscriber have advantageously been transferred for the use of the other subscriber and vice versa. In step 32, it is checked if the information has really been received and whether it has changed since the last session initiation. In step 33, a decision is taken on saving the information received. If saving of the information received is not wanted or if the information has not changed, the next step is 35, in which the data handling process according to the invention ends. If it is decided in step 33, either automatically or as accepted by the user of the terminal device, to save the session initiation information, saving takes place in step 34. When saving has been performed, the next step is 35, in which the handling process ends.

Figure 4:
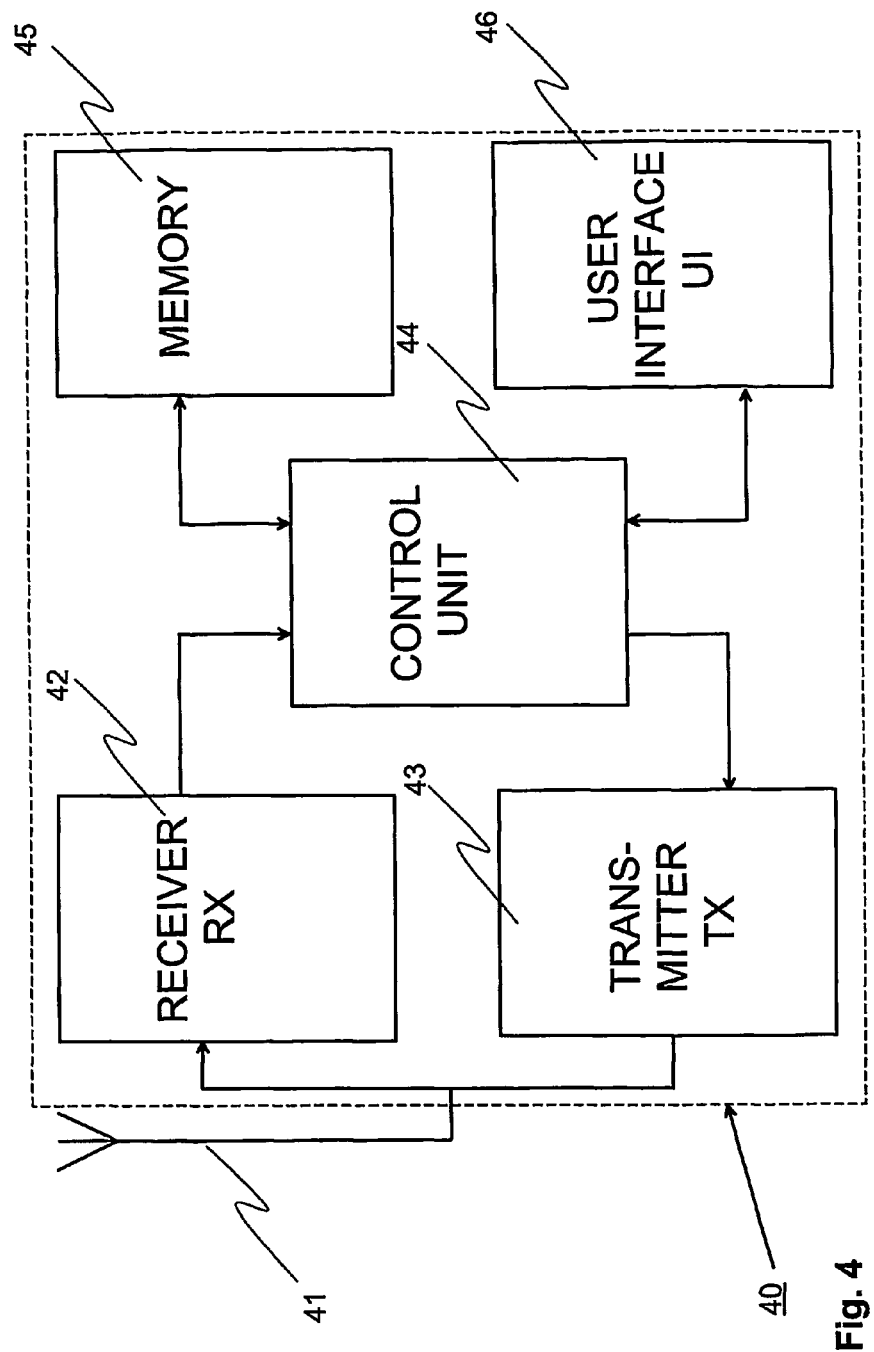
FIG. 4 shows, by way of example, a terminal device using the method according to the invention.

FIG. 4 shows, by way of example, the principal parts of a mobile terminal device 40 of a cellular network that is part of the data communications network arrangement according to the invention. The terminal device 40 uses an antenna 41 for signal transmission and reception. Reference number 42 denotes the equipment that compose the receiver RX, by which the mobile terminal device 40 receives a signal from the cellular network 12. The receiver 42 comprises prior art equipment for all messages or signals to be received.

Reference number 43 denotes the equipment that compose the transmitter TX of the mobile terminal device. The transmitter means 43 perform on the signal to be transmitted all the signal processing functions needed when working with the cellular network 12.

In the terminal device, the essential operational unit with regard to utilizing the invention is the control unit 44 that controls the operation of the terminal device. It controls the operation of all the essential parts of the terminal device 40. It controls both reception and transmission. It is also used to control both the user interface UI, referenced number 46, of the terminal device and the memory 45 of the terminal device.

In the device arrangement according to the invention, the control unit 44 decides when the session initiation information according to the invention received from some other terminal device is saved in the terminal device 40 and whether to send its own session initiation information to another terminal device. On the basis of the session initiation information of the other party/terminal device it has received it also decides whether to alert the user of terminal device 40 about the information received or not. These procedures are advantageously implemented by software applications saved in the memory 45 of the terminal device that implement the procedures of FIGS. 2 and 3.

The user interface 46 is used to control the functions of the terminal device and for the alerts and messages given to the user. By means of the user interface 46, the user of the terminal device 40 either accepts or prevents transmitting its own session initiation information. It can also be used to give a storing instruction concerning the session initiation information received.

Some preferred embodiments of the method and device according to the invention have been described above. The invention is not limited to the solutions just described, but it can also be used for exchanging between the parties e-mail addresses, web page addresses or possible image files related to a party. In addition, the inventive idea can be applied in many different ways within the scope defined by the attached claims.

The invention claimed is:

1. A method, comprising:
    determining to establish, using a session initiation protocol, a connection between a first terminal device and a second terminal device;
    transmitting an OK signal including session initiation information of the first terminal device to the second terminal device over the connection;
    receiving an ACK signal including session initiation information of the second terminal device at the first terminal device over the connection subsequent to transmitting the OK signal; and
    determining to update the session initiation information with the received session initiation information of the second terminal device;
    wherein an operation of storing received session initiation information occurs only in response to permission given by a user for a case where it is determined that there is no already stored session information associated with the terminal device from which the session information was received.

2. The method according to claim 1, where the session initiation information is sent and received during a session initiation procedure.

3. The method according to claim 1, where the session initiation information is at least one of the following: a session initiation protocol connection identifier, telephone number of a wired network, telephone number of a cellular network, e-mail address or a web page address.

4. The method according to claim 1, where received session initiation information is stored when the received session initiation information differs from the session initiation information.

5. The method according to claim 1, where received session information is stored only in response to permission given by a user for a case where it is determined that there is no already stored session information associated with the terminal device from which the session information was received.

6. The method according to claim 1, where the step of transmitting the OK signal occurs only in response to permission given by a user.

7. The method of claim 1, where the operations of transmitting session initiation information of the first terminal device to the second terminal device, and receiving session initiation information of the second terminal device, occur in cooperation with a SIP proxy server.

8. An apparatus, comprising:
    at least one processor; and
    at least one memory including computer program code,
    the at least one memory and the computer program code configured to, with the at least one processor, cause the apparatus to perform at least the following,
    determine to establish, using a session initiation protocol, a connection between said apparatus and a device;
    transmit an OK signal including session initiation information of the apparatus to the device over the connection;
    receive an ACK signal including session initiation information of the device from the device over the connection subsequent to transmitting the OK signal; and
    determine to update the session initiation information with the received session initiation information of the device;
    wherein an operation of storing received session initiation information occurs only in response to permission given by a user for a case where it is determined that there is no already stored session information associated with the terminal device from which the session information was received.

9. The apparatus according to claim 8, where said session initiation information transmitted or received by said apparatus is at least one of the following: a session initiation protocol connection identifier, telephone number of a wired network, telephone number of a cellular network, e-mail address or a web page address.

10. The apparatus according to claim 8, where received session initiation information is stored in said memory when the received session initiation information differs from the session initiation information.

11. The apparatus according to claim 8, where received session information is stored only in response to permission given by a user for a case where it is determined that there is no already stored session information associated with the device.

12. The apparatus according to claim 8, wherein the apparatus is further caused, at least in part, to operate in a cellular wireless communication network.

13. The apparatus of claim 8, wherein the apparatus is further caused, at least in part, to transmit the session initiation information only in response to permission given by a user.

14. The apparatus of claim 8, where the session initiation information of the apparatus is transmitted to the device via a SIP proxy server, and where the session initiation information is received from the device via the SIP proxy server.

15. A non-transitory computer-readable storage medium carrying one or more sequences of one or more instructions which, when executed by one or more processors, cause an apparatus to at least perform the following steps:
    determining to establish, using a session initiation protocol, a connection between the mobile terminal device and another terminal device;
    transmitting an OK signal including session initiation information of the mobile terminal device to the another terminal device over the connection;
    receiving an ACK signal including session initiation information of the another terminal device at the mobile terminal device subsequent to transmitting the OK signal; and
    determining to update the session initiation information with the received session initiation information of the another terminal device;
    wherein an operation of storing received session initiation information occurs only in response to permission given by a user for a case where it is determined that there is no already stored session information associated with the terminal device from which the session information was received.

16. The non-transitory computer-readable storage medium according to claim 15, where the session initiation information is sent and received during a session initiation procedure.

17. The non-transitory computer-readable storage medium according to claim 15, where the session initiation information comprises at least one of a session initiation protocol connection identifier, telephone number of a wired network, telephone number of a cellular network, e-mail address or a web page address.

18. The non-transitory computer-readable storage medium according to claim 15, where the operation of storing received session initiation information occurs in response to a determination that the received session initiation information differs from the session initiation information.

19. The non-transitory computer-readable storage medium according to claim 15, where the operation of sending session initiation information occurs only in response to permission given by a user.

* * * * *